United States Patent
Li et al.

(10) Patent No.: US 9,661,151 B2
(45) Date of Patent: May 23, 2017

(54) METHOD, APPARATUS AND SYSTEM FOR DETERMINING POLICY AND CHARGING RULE FUNCTION ENTITY

(71) Applicant: Huawei Technologies Co., Ltd., Shenzhen, Guangdong (CN)

(72) Inventors: Chunsheng Li, Shenzhen (CN); Feng Wu, Shenzhen (CN); Xuejin Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 238 days.

(21) Appl. No.: 14/313,557

(22) Filed: Jun. 24, 2014

(65) Prior Publication Data

US 2014/0307589 A1 Oct. 16, 2014

Related U.S. Application Data

(63) Continuation of application No. PCT/CN2011/085059, filed on Dec. 30, 2011.

(51) Int. Cl.
*H04M 15/00* (2006.01)
*H04L 12/14* (2006.01)
*H04L 29/08* (2006.01)

(52) U.S. Cl.
CPC ........ *H04M 15/66* (2013.01); *H04L 12/1407* (2013.01); *H04L 67/1002* (2013.01); *H04L 67/1036* (2013.01)

(58) Field of Classification Search
CPC ... H04M 15/66; H04M 15/64; H04L 41/5041; H04L 41/0893
See application file for complete search history.

(56) References Cited

U.S. PATENT DOCUMENTS 8,326,263 B2* 12/2012 Zhou .................. H04L 12/1403 455/406

8,521,858 B2* 8/2013 Shaikh .............. H04L 29/12216 709/223

(Continued)

FOREIGN PATENT DOCUMENTS

| CN | 101072170 A | 11/2007 |
|---|---|---|
| CN | 102123035 A | 7/2011 |

(Continued)

OTHER PUBLICATIONS

"3$^{rd}$ Generation Partnership Project; Technical Specification Group Core Network and Terminals; Policy and Charging Control signalling flows and Quality of Service (QoS) parameter mapping (Release 9)," 3GPP TS 29.213, V9.7.0, pp. 1-129, 3$^{rd}$ Generation Partnership Project, Valbonne, France (Sep. 2011).

*Primary Examiner* — Rasheed Gidado
(74) *Attorney, Agent, or Firm* — Leydig, Voit & Mayer, Ltd.

(57) ABSTRACT

Embodiments of the present invention provide a method, an apparatus, and a system for determining a policy and charging rule function entity. The method includes: receiving, by a first PCRF, a first request message transmitted by a first routing agent device, where the first request message carries an IP address of a user; inquiring a pre-stored corresponding relationship between the IP address of the user and an identity of a PCRF currently serving the user according to the IP address of the user, and determining an identity of a second PCRF currently serving the user; and transmitting a message carrying the identity of the second PCRF to the first routing agent device. The method realizes that session information of the same user can be routed to the same PCRF when a biplane DRA is under a multi-PCRF networking, and provides reliable DRA signaling network networking.

9 Claims, 4 Drawing Sheets

(56) References Cited

U.S. PATENT DOCUMENTS

| | | | | |
|---|---|---|---|---|
| 8,615,237 | B2* | 12/2013 | Baniel | H04M 15/66 |
| | | | | 455/435.2 |
| 8,812,557 | B2* | 8/2014 | Lataste | H04L 12/14 |
| | | | | 707/769 |
| 8,856,299 | B2* | 10/2014 | Hu | H04L 12/14 |
| | | | | 709/223 |
| 9,158,635 | B2* | 10/2015 | Fernandez Alonso | H04L 12/1407 |
| 2010/0235519 | A1 | 9/2010 | Hu et al. | |
| 2010/0284336 | A1* | 11/2010 | Rui | H04L 12/14 |
| | | | | 370/328 |
| 2010/0290392 | A1* | 11/2010 | Rasanen | H04L 12/14 |
| | | | | 370/328 |
| 2011/0138005 | A1* | 6/2011 | Zhou | H04L 12/14 |
| | | | | 709/206 |
| 2012/0210003 | A1* | 8/2012 | Castro | H04L 12/14 |
| | | | | 709/225 |
| 2012/0297076 | A1 | 11/2012 | Wu et al. | |

FOREIGN PATENT DOCUMENTS

| | | |
|---|---|---|
| CN | 102148689 A | 8/2011 |
| CN | 102300263 A | 12/2011 |
| WO | WO 2011127974 A1 | 11/2011 |

* cited by examiner

METHOD, APPARATUS AND SYSTEM FOR DETERMINING POLICY AND CHARGING RULE FUNCTION ENTITY

CROSS-REFERENCE TO RELATED APPLICATIONS

This application is a continuation of International Patent Application No. PCT/CN2011/085059, filed on Dec. 30, 2011, which is hereby incorporated by reference in its entirety.

TECHNICAL FIELD

The present invention relates to the field of communication technology and, in particular, to a method, an apparatus, and a system for determining a policy and charging rule function entity.

BACKGROUND

Diameter protocol is a kind of protocol widely applied in PCC (Policy and Charging Control, policy and charging control) architecture and an LTE (Long Term Evolution, long term evolution) of a 3G network, and an IMS (IP Multimedia Subsystem, IP multimedia subsystem) network. DRA (Diameter Routing Agent, Diameter message routing agent) is used for providing a Diameter signaling message routing function, and is deployed to form a next generation signaling network. DRA can achieve centralized forwarding of Diameter signaling in a multi-network architecture, which includes GPRS (General Packet Radio Service, general packet radio service) or EPC (Evolution Packet Core, evolved packet core), as well as mobility management, policy charging and charging information of a user in a PCC network.

In a PCC system, PCEF (Policy and Charging Enforcement Function, policy and charging enforcement function) entity is routed to PCRF (Policy and Charging Rule Function, policy and charging rule function) entity by DRA, and AF (Application Function, application function) entity is also routed to PCRF by DRA. Specifically, as for routing from the PCEF to the PCRF, the DRA makes routing analysis with a user's IMSI (International Mobile Subscriber Identification Number, international mobile subscriber identity); as for routing from the AF to the PCRF, because there is no user's IMSI in the routing request transmitted by the AF, then the DRA makes routing analysis with a user's IP address. The DRA needs to record corresponding relationship between an IP address and an IMSI of the same user, so as to guarantee that AF and PCEF of the same user can be routed to the same PCRF.

In order to improve reliability of signaling network networking, biplane networking can be used, that is, more than two DRAs can be used, where one or more DRAs act as a backup of another DRA or load sharing of more DRAs, so that signaling service cannot be affected even if one of DRAs goes wrong. However, there is only a method for determining a PCRF by an DRA in a scenario of monoplane networking provided in the prior art, and thereby a solution for determining a PCRF by an DRA in a scenario of biplane networking is strongly demanded.

SUMMARY

Embodiments of the present invention provide a method, an apparatus, and a system for determining a PCRF, so that sessions of the same user can be routed to the same RCPF in a scenario of biplane networking.

In one aspect, embodiments of the present invention provide a method for determining a PCRF, including:

receiving, by a first PCRF, a first request message transmitted by a first routing agent device, where the first request message carries an IP address of a user;

inquiring, by the first PCRF, a pre-stored corresponding relationship between the IP address of the user and an identity of a PCRF currently serving the user according to the IP address of the user, and determining an identity of a second PCRF currently serving the user; and transmitting, by the first PCRF, a message carrying the identity of the second PCRF to the first routing agent device, so that the first routing agent device transmits the first request message to the second PCRF according to the identity of the second PCRF.

In another aspect, embodiments of the present invention provide an apparatus for determining a PCRF, including:

a receiving unit, configured to receive a first request message transmitted by a first routing agent device, where the first request message carries an IP address of a user;

a determining unit, configured to inquire a pre-stored corresponding relationship between the IP address of the user and an identity of a PCRF currently serving the user according to the IP address of the user, and determine an identity of a second PCRF currently serving the user; and a transmitting unit, configured to transmit a message carrying the identity of the second PCRF to the first routing agent device, so that the first routing agent device transmits the first request message to the second PCRF according to the identity of the second PCRF.

In still another aspect, embodiments of the present invention provide a system for determining a PCRF, including a first routing agent device, a first PCRF and a second PCRF, the first PCRF is configured to receive a first request message transmitted by the first routing agent device, where the first request message carries an IP address of a user; inquire a pre-stored corresponding relationship between the IP address of the user and an identity of a PCRF currently serving the user according to the IP address of the user, and determine an identity of the second PCRF currently serving the user; and transmit a message carrying the identity of the second PCRF to the first routing agent device, so that the first routing agent device transmits the first request message to the second PCRF according to the identity of the second PCRF;

the first routing agent device is configured to transmit the first request message carrying the IP address of the user to the first PCRF; receive the message carrying the identity of the second PCRF transmitted by the first PCRF, and transmit the first request message to the second PCRF according to the identity of the second PCRF.

In the method for determining the PCRF provided by embodiments of the present invention, an identity of a second PCRF currently serving an user is obtained by inquiring pre-stored corresponding relationship between an IP address of the user and an identity of the PCRF currently serving the user according to the IP address of the user; and the message carrying the second PCRF identity is transmitted to the first routing agent device, so that the first routing agent device can transmit the first request message to the second PCRF according to the identity of the second PCRF. Thus, sessions of the same user can be routed to the same RCPF in a scenario of biplane networking.

BRIEF DESCRIPTION OF DRAWINGS

To illustrate the technical solutions in embodiments of the present invention more clearly, accompanying drawings needed in the embodiments or the prior art are illustrated briefly in the following. Apparently, the accompanying drawings show certain embodiments of the present invention, and persons skilled in the art can derive other drawings from them without creative efforts.

DESCRIPTION OF EMBODIMENTS

The technical solutions in the embodiments of the present invention are hereinafter described clearly and completely with reference to the accompanying drawings in the embodiments of the present invention. Obviously, the embodiments described here are part of the embodiments of the invention and not all of the embodiments. All other embodiments obtained by persons skilled in the art on the basis of the embodiments of the present invention without any creative efforts all fall within the scope of the invention.

Figure 1:
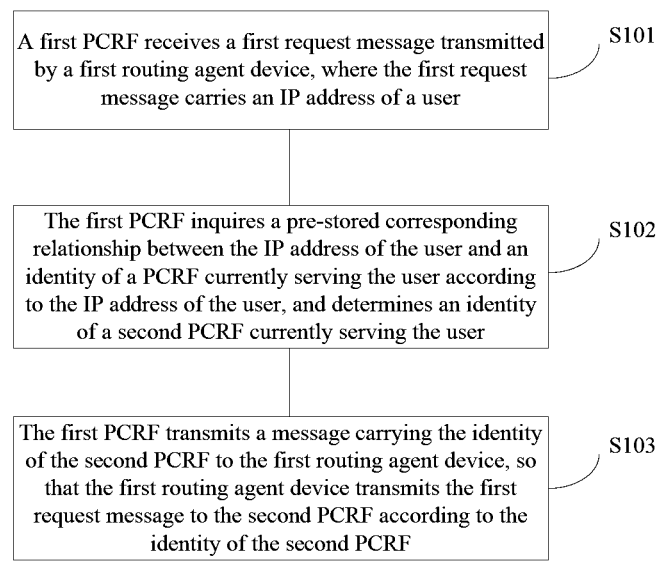
FIG. 1 is a flow chart of a method for determining PCRF according to Embodiment 1 of the present invention.

FIG. 1 is a flow chart of a method for determining PCRF according to Embodiment 1 of the present invention, as shown in FIG. 1, the method includes:

S101, A first PCRF receives a first request message transmitted by a first routing agent device, where the first request message carries an IP (Internet Protocol) address of a user.

All embodiments of the present invention can be applied to a network under DRA biplane networking, including networks such as PCC, IMS, GPRS and LTE. Each embodiment of the present invention in the following will be described by taking a DRA as an example of a routing agent device.

S102, The first PCRF inquires a pre-stored corresponding relationship between the IP address of the user and an identity of a PCRF currently serving the user according to the IP address of the user, and determines an identity of a second PCRF currently serving the user.

Herein, the identity of the PCRF may be a host identity of the PCRF; or may be an IP address and a port number of the PCRF; or may be a serial number of PCRF, where the serial number may be pre-configured among PCRFs (including the first PCRF and the second PCRF) in the network, for example, serial number 1 indicates PCRF1, serial number 2 indicates PCRF2, and when the serial number is known for each PCRF (including the first PCRF and the second PCRF), the PCRF which the serial number indicates will be known. Of course, the identity of the PCRF is not limited to those listed above.

S103, The first PCRF transmits a message carrying the identity of the second PCRF to the first routing agent device, so that the first routing agent device transmits the first request message to the second PCRF according to the identity of the second PCRF.

Herein, the identity of the second PCRF may be a host identity (may also be called a host name) of the second PCRF, or may be an IP address and a port number of the second PCRF, of course, it is not limited thereto.

Optionally, if the corresponding relationship between the IP address of the user and the identity of the PCRF currently serving the user is pre-stored in the PCRF, then in S102, the first PCRF inquires the corresponding relationship between the IP address of the user and the identity of the PCRF currently serving the user, where the corresponding relationship is pre-stored in the first PCRF itself. In embodiments of the present invention, the first PCRF is used to indicate another PCRF different from the second PCRF.

If the corresponding relationship between the IP address of the user and the identity of the PCRF currently serving the user is pre-stored in the SPR (Subscription Profile Repository, subscription profile repository), then in S102, the first PCRF inquires the corresponding relationship between the IP address of the user and the identity of the PCRF currently serving the user, where the corresponding relationship is pre-stored in the SPR. The SPR is a database shared by multiple PCRFs (including a first PCRF and a second PCRF) in the network. Optionally, the first PCRF or the SPR further receives the corresponding relationship between the IP address of the user and the identity of the second PCRF transmitted by the second PCRF; the first PCRF or the SPR updates the corresponding relationship between the IP address of the user and the identity of the PCRF currently serving the user with the corresponding relationship between the IP address of the user and the identity of the second PCRF.

As for the solution that the corresponding relationship between the IP address of the user and the identity of the PCRF currently serving the user is pre-stored in the PCRF, if there are more than two other PCRFs, in addition to the second PCRF, in the network, then the second PCRF transmits the corresponding relationship between the IP address of the user and the identity of the second PCRF to other PCRFs in broadcast mode or in sequential transmission mode, and the specific transmission mode is not limited herein. The second PCRF and other PCRFs updates the corresponding relationship between the IP address of the user and the identity of the PCRF currently serving the user with the corresponding relationship between the IP address of the user and the identity of the second PCRF, where the corresponding relationship between the IP address of the user and the identity of the PCRF currently serving the user is pre-stored in each PCRF itself.

Through storing the corresponding relationship in the SPR or the PCRF, embodiments of the present invention can fully utilize an existing database of the SPR or the PCRF, and do not need to make large investment for the existing device, thus the existing device investment is protected and the network maintenance costs is reduced.

Optionally, before the first PCRF or the SPR receives the corresponding relationship between the IP address of the user and the identity of the second PCRF transmitted by the second PCRF, the method further includes: the second routing agent device receives a second request message carrying a user identity of the user and the IP address of the user transmitted by a PCEF. Where, the user identity is used to identify a user, for example, the user identity may be the IMSI of the user.

The second routing agent device may determine the second PCRF according to the user identity of the user and the IP address of the user which are carried in the second request message transmitted by the PCEF, or may determine the second PCRF according to an algorithm. Then, the second PCRF transmits the corresponding relationship between the IP address of the user and the identity of the second PCRF to the first PCRF or the SPR. The algorithm herein may be that the second routing agent device determines the second PCRF in a polling method, or the second routing agent device determines the second PCRF according to a load sharing proportion of each PCRF. Compared to the method for determining a PCRF by performing the static configuration according to the IMSI of the user, the method for determining a PCRF serving the user according to an algorithm by the second routing agent device can achieve an effect of dynamically sharing the load on the PCRF.

Optionally, if the network may allocate the same IP address for different users, then corresponding PCRF or SPR stores the corresponding relationship among the IP address of the user, the network identity and the identity of the PCRF currently serving the user. Particularly, the network identity is acquired by the first PCRF from the first request message. Correspondingly, the first request message also carries a network identity, such as APN (Access Point Name, access point name). The first PCRF receives the first request message carrying the network identity and the IP address of the user, then inquires the stored corresponding relationship among the IP address of the user, the network identity and the identity of the PCRF currently serving the user according to the network identity and the IP address of the user, and determines the identity of the second PCRF currently serving the user. Correspondingly, the second PCRF acquires the IP address of the user and the network identity from the second request message transmitted by the second routing agent device. The specific interactive method between the PCRF and the routing agent device, and the interaction between the PCRF and the routing agent device when the corresponding relationship is the relationship between the IP address of the user and the identity of the PCRF currently serving the user, will not be described herein again.

According to the method for determining the PCRF provided in embodiments of the present invention, the sessions of the same user can be routed to the same RCPF, thereby solving the problem and realizing that sessions of the same user can be routed to the same PCRF when a biplane DRA is under a multi-PCRF networking, and further providing reliable DRA signaling network networking.

Embodiments of the present invention will be described in more detail with reference to specific examples. It should be noted that, embodiments in FIG. 2 and FIG. 3 are merely intended to facilitate persons skilled in the art to better understand the present invention, but are not intended to limit the scope of the present invention.

Figure 2:
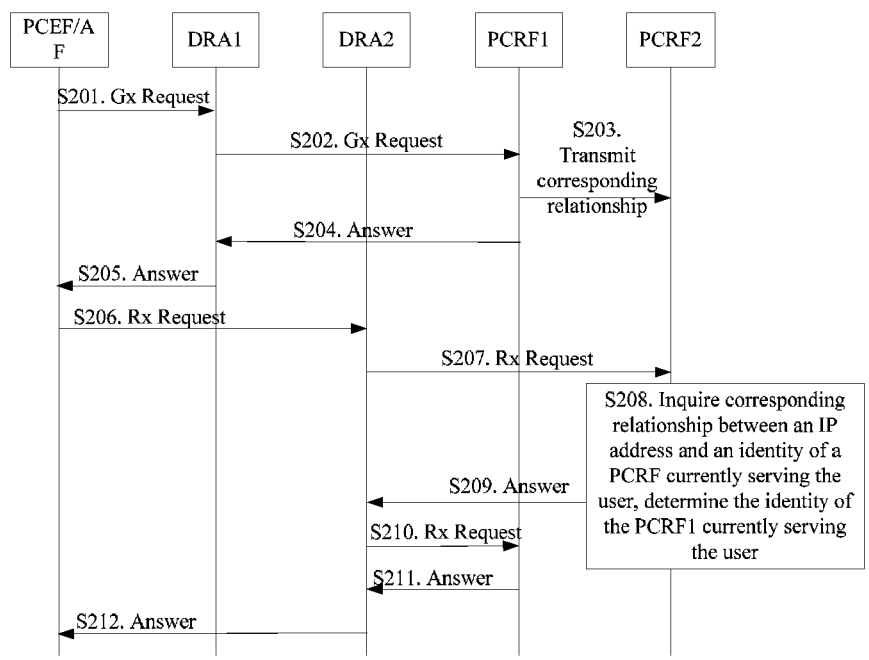
FIG. 2 is a flow chart of a method for determining PCRF according to Embodiment 2 of the present invention.
Figure 3:
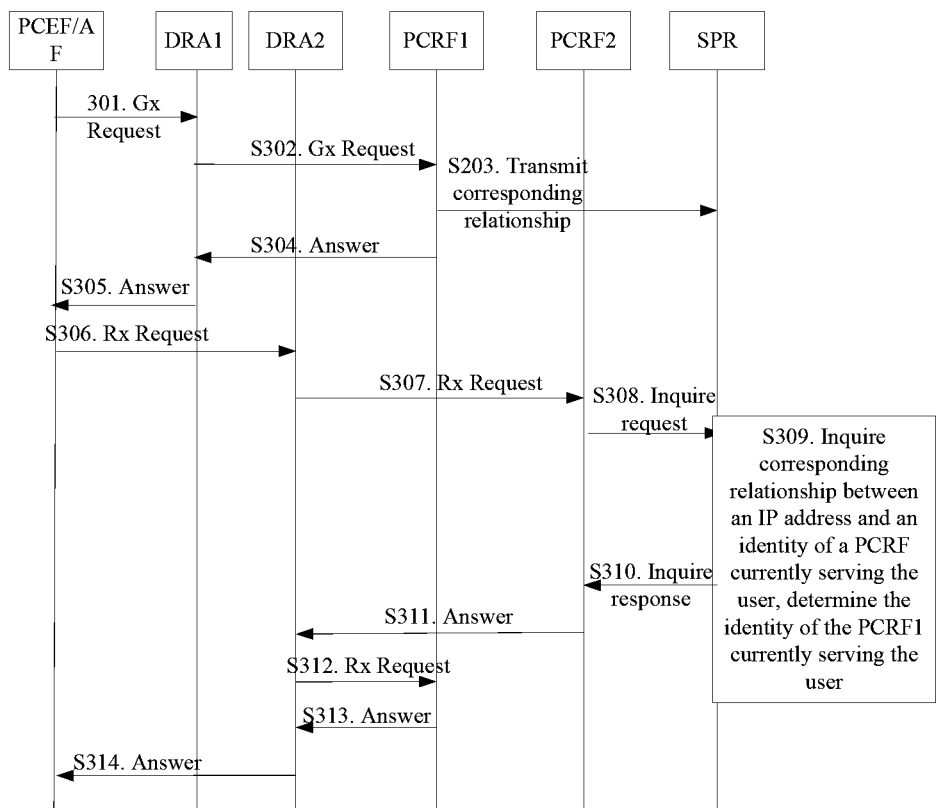
FIG. 3 is a flow chart of a method for determining PCRF according to Embodiment 3 of the present invention.

The method for determining PCRF in embodiments of the present invention is described by taking a PCC network with two DRA networking as an example in embodiments of FIG. 2 and FIG. 3. Embodiments of the present invention are not limited thereto, and the method provided in embodiments of the present invention may also be applied in other networks with two or more DRA networking, such as IMS, GPRS or LTE network. Correspondingly, Rx request message between AF and DRA interfaces is taken as an example of the first request message, Gx request message between PCEF and DRA interfaces is taken as an example of the second request message, PCRF2 and PCRF1 are taken as examples of the first PCRF and the second PCRF respectively, DRA2 and DRA1 are taken as examples of the first routing agent device and the second routing agent device respectively.

FIG. 2 is a flow chart of a method for determining PCRF according to Embodiment 2 of the present invention. S201-S205 are processes of storing corresponding relationship between the IP address of the user and the identity of the PCRF currently serving the user, and S206-S211 are processes of determining the PCRF by utilizing the stored corresponding relationship.

S201, after a request message transmitted by a user is received, an end device PCEF initiates a Gx request message to DRA1, for establishing an IP CAN (IP Connectivity Access Network, IP connectivity access network) session between the PCEF and a PCRF.

The Gx request message carries user identity of the user (such as the IMSI of the user) and the IP address of the user, and the IP address is an address dynamically allocated by the PCEF for the user when the user accesses, so that the user can perform subsequent services, for example, the user also uses the IP address when determines the PCRF through an AF.

S202, after the Gx request message transmitted by the PCEF is received, DRA1 determines that the PCRF serving the user is PCRF1, and then routes the Gx request message to PCRF1.

The Gx request message carries user identity of the user (such as the IMSI of the user) and the IP address of the user. Of course, PCEF information may also be carried as described in the prior art, which will not be described herein.

Specifically, DRA1 may determine that the PCRF serving the user is PCRF1 by one of the following two methods:

A first method, DRA1 determine the PCRF1 according to the user identity carried in the Gx request message.

A second method, DRA1 may also determine the PCRF1 according to an algorithm. The algorithm herein may be that the DRA1 determines the PCRF1 in a method of polling PCRF, or determines the PCRF1 according to a load sharing proportion of each PCRF. Compared to the method for determining the PCRF serving the user by performing the static configuration according to the IMSI of the user, the method for determining the PCRF according to the algorithm by the DRA1 can achieve an effect of dynamically sharing the load on the PCRF.

S203, after the Gx request message transmitted by the DRA1 is received, the PCRF1 stores the corresponding relationship between the IP address of the user and the identity of the PCRF1 currently serving the user, and then transmits the corresponding relationship to PCRF2, so that the PCRF2 stores the corresponding relationship.

Two actions that the PCRF1 stores the corresponding relationship and transmits the corresponding relationship to the PCRF2 have no sequential order.

Optionally, if the PCRF (including PCRF1 and PCRF2) has already stored multiple corresponding relationships between an IP address of a user and an identity of a PCRF serving the user, then in S203, the storing, by the PCRF, corresponding relationship between the IP address of the user and the identity of the PCRF1 currently serving the user, may be deemed as updating the corresponding relationship between the IP address of the user and the identity of the PCRF1 to the stored corresponding relationship between the IP address of the user and the identity of the PCRF serving the user.

Optionally, if the same IP address is allocated for different users, then the Gx request message also carries a network identity, such as APN. Correspondingly, the stored corresponding relationship is the corresponding relationship among the IP address of the user, the network identity and the identity of the PCRF currently serving the user.

If there are multiple PCRFs in the network, for example, there are other PCRFs in addition to PCRF1 and PCRF2, then the PCRF1 also transmits the corresponding relationship to other PCRFs, so that other PCRFs also store the corresponding relationship. In this way, if sessions of the user are subsequently routed to other PCRFs, other PCRFs can determine the PCRF serving the user according to the stored corresponding relationship.

S204, The PCRF1 transmits an answer message to the DRA1.

S205, The DRA1 transmits the answer message to the PCEF.

S206, When the user initiates a session through an end device AF, the AF transmits an Rx request message carrying the IP address of the user to the DRA2, so as to establish an IP CAN session between the AF and the PCRF.

S207, The DRA2 determines that the PCRF to which the Rx request message to be routed is routed is PCRF2, and then routes the Rx request message to the PCRF2.

The Rx request message carries the IP address of the user, and, of course, may also carry AF information as described in the prior art, which will not be described herein.

Optionally, DRA2 may also determine the PCRF2 according to an algorithm. The algorithm herein may be that the DRA2 determines the PCRF2 in a method of polling PCRF, or determines the PCRF2 according to a load sharing proportion of each PCRF.

S208, The PCRF2 inquires the corresponding relationship between the IP address of the user and the identity of the PCRF currently serving the user according to the IP address of the user carried in the Rx request message, and determines the identity of the PCRF1 currently serving the user.

Optionally, if the PCRF stores the corresponding relationship among the IP address of the user, the network identity and the identity of the PCRF currently serving the user, the PCRF2 receives the Rx request message carrying the network identity and the IP address of the user, and then inquires the stored corresponding relationship among the IP address of the user, the network identity and the identity of the PCRF currently serving the user according to the network identity and the IP address of the user, so as to determine the PCRF1.

S209, The PCRF2 transmits an Answer message to the DRA2, where the Answer message carries an indication for redirecting the Rx request message to the PCRF1, so as to indicate the DRA2 to redirect the Rx request message to the PCRF1.

Specifically, the Answer message may carry Result-Code=DIAMETER_REDIRECT_INDICATION, and Redirect-Host=PCRF1. DIAMETER_REDIRECT_INDICATION is a redirect indication and Redirect-Host=PCRF1 is to indicate that the target PCRF of the redirection is PCRF1.

S210, The DRA2 transmits the Rx request message carrying the IP address of the user to the PCRF1.

S211, The PCRF1 transmits the Answer message to the DRA2.

S212, The DRA2 transmits the Answer message to the PCEF.

Optionally, after the above embodiments, the method may also include: the user initiates a session end message to trigger a process of deleting the corresponding relationship between the IP address of the user and the identity of the PCRF1 currently serving the user stored in each PCRF. Specifically, when the user initiates the session end message, the PCEF transmits to the DRA1 the session end message which is used for deactivating the IP CAN connection between the PCEF and the PCRF1; the DRA1 transmits the session end message to the PCRF1; the PCRF1 deletes the corresponding relationship between the IP address of the user and the identity of the PCRF1 currently serving the user stored in the PCRF1 itself, and transmits the message to other PCRFs, so that other PCRFs also can delete the corresponding relationship between the IP address of the user and the identity of the PCRF1 currently serving the user. Thereby, the corresponding relationship stored in each PCRF can be synchronized.

According to the method for determining the PCRF provided in embodiments of the present invention, the sessions of the same user can be routed to the same RCPF, thereby solving the problem and realizing that sessions of the same user can be routed to the same PCRF when a biplane DRA is under a multi-PCRF networking, and further providing reliable DRA signaling network networking.

Further, storing the corresponding relationship between the IP address of the user and the identity of the PCRF currently serving the user in the PCRF can fully utilize an existing database of the PCRF, and do not need to make large investment for the existing device, thus the existing device investment is protected and the network maintenance costs is reduced.

Further, after the request message transmitted by the end device is received, the DRA determines the PCRF serving the user in a polling method, or according to a load sharing proportion of each PCRF, and routes the request message to the determined PCRF, thereby achieving an effect of dynamically sharing the load on the PCRF.

Further, after the session is ended, the user initiates the session end message, so that each PCRF can delete the stored corresponding relationship between the IP address of the user and the identity of the PCRF1 currently serving the user, thus, the corresponding relationship stored in each PCRF is synchronized and useless information in the PCRF is timely cleared.

FIG. 3 is a flow chart of a method for determining PCRF according to Embodiment 3 of the present invention. S301-S305 are processes of storing corresponding relationship between the IP address of the user and the identity of the PCRF currently serving the user, and S306-S314 are processes of determining the PCRF currently serving the user by using the stored corresponding relationship. Different from FIG. 2, where the corresponding relationship between the IP address of the user and the identity of the PCRF currently serving the user is stored in the PCRF in the network, the corresponding relationship between the IP address of the user and the identity of the PCRF currently serving the user is stored in the SPR in FIG. 3.

S301-S302 are the same as S201-S202, and the details will not be described herein again.

S303, The PCRF1 transmits to the SPR the corresponding relationship between the IP address of the user and the identity of the PCRF currently serving the user after the Gx request message transmitted by the DRA1 is received.

Since SPR is a database which can be shared by multiple PCRFs in the network, all the PCRFs in the network can inquire and acquire the corresponding relationship if it is stored in the SPR.

S304-S307 are the same as S204-S207, and the details will not be described herein again.

S308, The PCRF2 transmits to the SPR a query request message carrying the IP address of the user.

S309, SPR inquires the stored corresponding relationship between the IP address of the user and the identity of the PCRF currently serving the user according to the IP address of the user, and determines the identity of the PCRF1 currently serving the user.

S310, The SPR transmits to the PCRF2 a query response message carrying the identity of the PCRF1, after the PCRF1 is determined.

S311-S314 are the same as S209-S212, and the details will not be described herein again.

Optionally, if the SPR stores the corresponding relationship among the IP address of the user, the network identity and the identity of the PCRF currently serving the user, the PCRF2 receives an Rx request message carrying the network identity and the IP address of the user, and then inquires the corresponding relationship among the IP address of the user, the network identity and the identity of the PCRF currently serving the user stored in the SRP according to the network identity and the IP address of the user, so as to determine the PCRF1.

Optionally, after the above embodiments, the method may also include: the user initiates a session end message to trigger a process of deleting the corresponding relationship stored in the SPR. Specifically, when the user initiates the session end message, the PCEF transmits to the DRA1 the session end message which is used for deactivating the IP CAN connection between the PCEF and the PCRF1; the DRA1 transmits the session end message to the PCRF1; the PCRF1 transmits the message to the SPR, so that the SPR deletes the corresponding relationship between the IP address of the user and the identity of the PCRF1 currently serving the user stored in the SPR itself.

According to the method for determining the PCRF provided in embodiments of the present invention, the sessions of the same user can be routed to the same RCPF, thereby solving the problem and realizing that session information of the same user can be determined to the same PCRF when a biplane DRA is under a multi-PCRF networking, and further providing reliable DRA signaling network networking.

Further, storing the corresponding relationship between the IP address of the user and the identity of the PCRF currently serving the user in the SPR can fully utilize an existing database of the SPR, and do not need to make large investment for the existing device, thus the existing device investment is protected and the network maintenance costs is reduced Further, after the request message transmitted by the end device is received, the DRA1 determines the PCRF serving the user in a polling method, or according to a load sharing proportion OF each PCRF, and routes the request message to the PCRF serving the user, thereby achieving an effect of dynamically sharing the load on the PCRF.

Further, after the session is ended, the user initiates the session end message, so that the SPR can delete the stored corresponding relationship, and timely clear useless information in the SPR.

Figure 4:
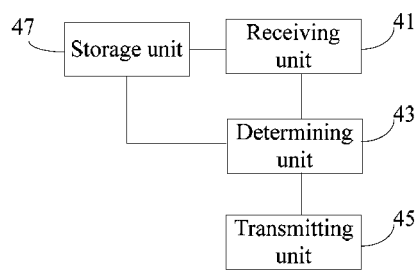
FIG. 4 is a schematic diagram of an apparatus for determining PCRF according to an embodiment of the present invention.

FIG. 4 is a schematic diagram of an apparatus for determining a policy and charging rule function entity (PCRF) according to an embodiment of the present invention. The apparatus 40 in FIG. 4 includes a receiving unit 41, a determining unit 43 and a transmitting unit 45.

The receiving unit 41 is configured to receive a first request message carrying an IP address of a user transmitted by the first routing agent device; the determining unit 43 is configured to inquire a pre-stored corresponding relationship between the IP address of the user and an identity of a PCRF currently serving the user according to the IP address of the user, and determine an identity of a second PCRF currently serving the user; and the transmitting unit 45 is configured to transmit the message carrying the identity of the second PCRF to the first routing agent device, so that the first routing agent device transmits the first request message to the second PCRF according to the identity of the second PCRF.

Optionally, the apparatus 40 further includes a storage unit 47, configured to store the corresponding relationship between the IP address of the user and the identity of the PCRF currently serving the user.

Optionally, the determining unit 43 is specifically configured to inquire the corresponding relationship between the IP address of the user and the identity of the PCRF currently serving the user according to the IP address of the user carried in the first request message, and determine the identity of the second PCRF currently serving the user, where the corresponding relationship is pre-stored in the apparatus itself.

Optionally, the receiving unit 41 is further configured to receive the corresponding relationship between the IP address of the user and the identity of the second PCRF, where the corresponding relationship is transmitted by the second PCRF.

Optionally, the storage unit 47 is further configured to update the corresponding relationship between the IP address of the user and the identity of the PCRF currently serving the user with the corresponding relationship between the IP address of the user and the identity of the second PCRF received by the receiving unit.

According to the apparatus for determining the PCRF provided in embodiments of the present invention, the sessions of the same user can be routed to the same RCPF, thereby solving the problem and realizing that session information of the same user can be routed to the same PCRF when a biplane DRA is under a multi-PCRF networking, and further providing reliable DRA signaling network networking.

Figure 5:
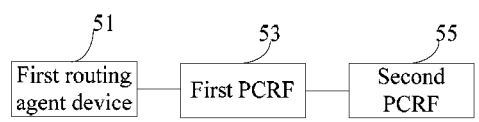
FIG. 5 is a schematic diagram of a system for determining PCRF according to Embodiment 1 of the present invention.

FIG. 5 is a schematic diagram of a system for addressing a policy and charging rule function entity (PCRF) according to Embodiment 1 of the present invention. The system includes a first routing agent device 51, a first PCRF 53 and a second PCRF 55.

The first PCRF 53 is configured to receive a first request message carrying an IP address of a user transmitted by the first routing agent device; inquire a pre-stored corresponding relationship between the IP address of the user and an identity of a PCRF currently serving the user according to the IP address of the user, and determine an identity of the second PCRF currently serving the user; and transmit a message carrying the identity of the second PCRF to the first routing agent device, so that the first routing agent device transmits the first request message to the second PCRF according to the identity of the second PCRF. The first routing agent device 51 is configured to transmit the first request message carrying the IP address of the user to the first PCRF; receive the message carrying the identity of the second PCRF transmitted by the first PCRF, and transmit the first request message to the second PCRF according to the identity of the second PCRF.

Figure 6:
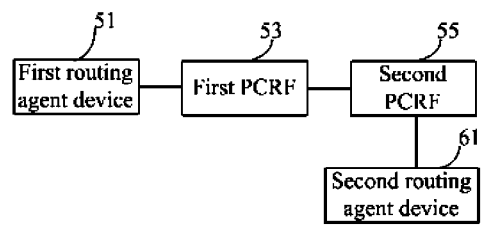
FIG. 6 is a schematic diagram of a system for determining PCRF according to Embodiment 2 of the present invention.

As shown in FIG. 6, which is a schematic diagram of a system for addressing a policy and charging rule function entity (PCRF) according to Embodiment 2 of the present invention, the system includes the first routing agent device 51, the first PCRF 53 and the second PCRF 55 as shown in FIG. 5, the first PCRF 53 is further configured to store the corresponding relationship between the IP address of the user and the identity of the PCRF currently serving the user;

correspondingly, the first PCRF inquires the corresponding relationship between the IP address of the user and the identity of the PCRF currently serving the user, where the corresponding relationship is pre-stored in the first PCRF itself.

Specifically, the first PCRF 53 may be the apparatus shown in FIG. 4.

Optionally, the first PCRF 53 is further configured to receive the corresponding relationship, which is transmitted by the second PCRF, between the IP address of the user and the identity of the second PCRF, and update the stored corresponding relationship between the IP address of the user and the identity of the PCRF currently serving the user with the corresponding relationship between the IP address of the user and the identity of the second PCRF.

Optionally, it further includes a second routing agent device 61, configured to receive a second request message carrying a user identity of the user and the IP address of the user, transmitted by a PCEF entity; determine the second PCRF serving the user according to the user identity or an algorithm; and transmit the second request message carrying the IP address of the user to the second PCRF; where the first routing agent device and the second routing agent device are the same routing agent device, or the first routing agent device and the second routing agent device are different routing agent devices. The second PCRF is further configured to transmit the corresponding relationship between the IP address of the user and the identity of the second PCRF to the first PCRF.

Figure 7:
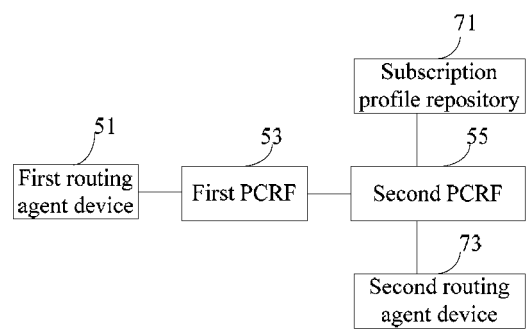
FIG. 7 is a schematic diagram of a system for determining PCRF according to Embodiment 3 of the present invention.

As shown in FIG. 7, which is a schematic diagram of a system for addressing a policy and charging rule function entity (PCRF) according to Embodiment 3 of the present invention, the system may further include a subscription profile repository SPR 71, in addition to the first routing agent device 51, the first PCRF 53 and the second PCRF 55 as shown in FIG. 5.

The SPR 71 is configured to store the corresponding relationship between the IP address of the user and the identity of the PCRF currently serving the user;

correspondingly, the first PCRF inquires the corresponding relationship between the IP address of the user and the identity of the PCRF currently serving the user, where the corresponding relationship is pre-stored in the SPR.

Optionally, the SPR 71 is further configured to receive the corresponding relationship, which is transmitted by the second PCRF, between the IP address of the user and the identity of the second PCRF, and update the stored corresponding relationship between the IP address of the user and the identity of the PCRF currently serving the user with the corresponding relationship between the IP address of the user and the identity of the second PCRF.

Optionally, it further includes a second routing agent device 73, configured to receive a second request message carrying a user identity of the user and the IP address of the user, transmitted by a PCEF entity; determine the second PCRF serving the user according to the user identity or an algorithm; and transmit the second request message carrying the IP address of the user to the second PCRF; where the first routing agent device and the second routing agent device are the same routing agent device, or the first routing agent device and the second routing agent device are different routing agent devices. The second PCRF is configured to transmit the corresponding relationship between the IP address of the user and the identity of the second PCRF to the SPR 73.

The specific interactive method among devices in the system can be reference to the description in the method embodiments, and will not be described herein again.

Persons skilled in the art are aware that the various exemplary units and algorithm steps described in connection with the embodiments disclosed herein may be implemented as electronic hardware, or a combination of computer software and electronic hardware. Whether these functions are executed through hardware or software depends on special applications and design restrictions of the technical solutions. Professional technicians may implement the described functions in varying ways for each special application, but such implementation decisions should not be interpreted as causing a departure from the scope of the present invention.

Persons skilled in the art can understand that, for convenience and brevity of description, for the detailed working procedures of the systems, apparatuses, and units described above, please refer to the corresponding procedures in the method embodiments, and are not repeated herein.

Understandably, in the embodiments described herein, the disclosed systems, apparatuses and methods may be implemented in other modes. For example, the device embodiments above are illustrative in nature, and the units of the device are defined from the perspective of logical functions only and may be defined in a different way in practical application. For example, multiple units or components may be combined or integrated into another system, or some features may be ignored or not executed. Besides, the coupling, direct coupling or communication connection illustrated or discussed herein may be implemented through indirect coupling or communication connection between interfaces, devices or units, and may be electronic, mechanical, or in other forms.

The units described as stand-alone components above may be separated physically or not; and the components illustrated as units may be physical units or not, namely, they may be located in one place, or distributed on multiple network elements. Some or all of the units described above may be selected as required to fulfill the objectives of the technical solutions of the present invention.

Besides, all functional units in the embodiments of the present invention may be physically stand-alone, or integrated into a processing module, or two or more of the units are integrated into one unit.

When being implemented as a software function unit and sold or used as a stand-alone product, the functions may be stored in a computer-readable storage medium. Therefore, the essence of the technical solution of the present invention, or its contribution to the prior art, or part of the technical solutions, may be embodied in a software product. The software product may be stored in a computer-readable storage medium and incorporates several instructions for instructing a computer device (for example, personal computer, server, or network device) to execute all or part of the steps of the method specified in any embodiment of the present invention. Examples of the storage medium include various media capable of storing program codes, such as a USB flash disk, a mobile hard disk, a read-only memory (ROM, Read-Only Memory), a random access memory (RAM, Random Access Memory), a magnetic disk, or an optical disk.

The above descriptions are merely preferred embodiments of the present invention, but not intended to limit the protection scope of the present invention. Any modifications, variations or replacement that can be easily derived by persons skilled in the art within the technical scope disclosed by the present invention shall fall within the protection scope of the present invention. Therefore, the protection scope of the present invention is subject to the appended claims.

What is claimed is:

1. A method for determining a policy and charging rule function entity (PCRF), comprising:
   receiving, by a first PCRF, a first request message transmitted by a first routing agent device, wherein the first request message carries an IP address of a user equipment (UE);
   inquiring, by the first PCRF, a pre-stored corresponding relationship between the IP address of the UE and an identity of a PCRF currently serving the UE according to the IP address of the UE, and determining an identity of a second PCRF currently serving the UE; and
   transmitting, by the first PCRF, a message carrying the identity of the second PCRF to the first routing agent device, to enable the first routing agent device to transmit the first request message to the second PCRF according to the identity of the second PCRF;
   wherein, the inquiring the pre-stored corresponding relationship between the IP address of the UE and the identity of the PCRF currently serving the UE, comprises:
   inquiring, by the first PCRF, the pre-stored corresponding relationship between the IP address of the UE and the identity of the PCRF currently serving the UE in the first PCRF itself or in a subscription profile repository (SPR), wherein the pre-stored corresponding relationship is transmitted by the second PCRF currently serving the UE, which is determined by a second routing agent device according to a UE identity or an algorithm after the second routing agent device receives a second request message transmitted by a policy and charging enforcement function entity (PCEF), wherein the second request message carries the UE identity of the UE and the IP address of the UE;
   wherein the first routing agent device and the second routing agent device are the same routing agent device, or the first routing agent device and the second routing agent device are different routing agent devices.

2. The method according to claim 1, further comprising:
   receiving, by the first PCRF or the SPR, the corresponding relationship transmitted by the second PCRF, wherein the corresponding relationship is between the IP address of the UE and the identity of the second PCRF, and updating, by the first PCRF or the SPR, the corresponding relationship between the IP address of the UE and the identity of the PCRF currently serving the UE with the corresponding relationship between the IP address of the UE and the identity of the second PCRF.

3. The method according to claim 1, wherein the pre-stored corresponding relationship is a corresponding relationship among the IP address of the UE, a network identity and the identity of the PCRF currently serving the UE;
   correspondingly, the first request further carries the network identity.

4. An apparatus for determining a policy and charging rule function entity (PCRF), comprising:
   a non-transitory processor readable medium storing instructions; and
   a processor executing the instructions stored in the non-transitory processor readable medium, wherein execution of the instructions configures the apparatus to:
   receive a first request message transmitted by a first routing agent device, wherein the first request message carries an IP address of a user equipment (UE);
   inquire a pre-stored corresponding relationship between the IP address of the UE and an identity of a PCRF currently serving the UE according to the IP address of the UE, and determine an identity of a second PCRF currently serving the UE; and
   transmit a message carrying the identity of the second PCRF to the first routing agent device, to enable the first routing agent device to transmit the first request message to the second PCRF according to the identity of the second PCRF;
   wherein the apparatus is configured to inquire the corresponding relationship between the IP address of the UE and the identity of the PCRF currently serving the UE according to the IP address of the UE carried in the first request message, and determine the identity of the second PCRF currently serving the UE, wherein the corresponding relationship is pre-stored in the apparatus itself or in a subscription profile repository (SPR), wherein the pre-stored corresponding relationship is transmitted by the second PCRF currently serving the UE, which is determined by a second routing agent device according to a UE identity or an algorithm after the second routing agent device receives a second request message transmitted by a policy and charging enforcement function entity (PCEF), wherein the second request message carries the UE identity of the UE and the IP address of the UE; wherein the first routing agent device and the second routing agent device are the same routing agent device, or the first routing agent device and the second routing agent device are different routing agent devices.

5. The apparatus according to claim 4, wherein execution of the instructions further configures the apparatus to: store the corresponding relationship between the IP address of the UE and the identity of the PCRF currently serving the UE.

6. The apparatus according to claim 4, wherein execution of the instructions further configures the apparatus to update the corresponding relationship between the IP address of the UE and the identity of the PCRF currently serving the UE with the corresponding relationship between the IP address of the UE and the identity of the second PCRF received by the receiving unit.

7. A system for determining a policy and charging rule function entity (PCRF), comprising a first routing agent device, a first PCRF, a second routing agent device and a second PCRF; wherein the first routing agent device communication connects with the first PCRF and the second PCRF, wherein:
   the first PCRF receives a first request message transmitted by the first routing agent device, wherein the first request message carries an IP address of a user equipment (UE); inquires a pre-stored corresponding relationship between the IP address of the UE and an identity of a PCRF currently serving the UE according to the IP address of the UE, and determines an identity of the second PCRF currently serving the UE; and transmits a message carrying the identity of the second PCRF to the first routing agent device, to enable the first routing agent device to transmit the first request message to the second PCRF according to the identity of the second PCRF; wherein the corresponding relationship is pre-stored in the apparatus itself, or, the system further comprising a subscription profile repository (SPR), the SPR communication connects with the first PCRF, and the corresponding relationship is pre-stored in the SPR, wherein the SPR further receives the corresponding relationship between the IP address of the UE and the identity of the second PCRF, and updates the stored corresponding relationship between the IP address of the UE and the identity of the PCRF currently serving the UE with the corresponding relationship between the IP address of the UE and the identity of the second PCRF, wherein the corresponding relationship is transmitted by the second PCRF;

the first routing agent transmits the first request message carrying the IP address of the UE to the first PCRF; receives the message transmitted by the first PCRF, wherein the message carries the identity of the second PCRF, and transmits the first request message to the second PCRF according to the identity of the second PCRF;

the second routing agent device communication connects with the second PCRF, wherein: the second routing agent device receives a second request message transmitted by a policy and charging enforcement function entity (PCEF), wherein the second request message carries a user identity of the UE and the IP address of the UE; determines the second PCRF serving the UE according to the UE identity or an algorithm; and transmits the second request message carrying the IP address of the UE to the second PCRF; wherein the first routing agent device and the second routing agent device are the same routing agent device, or the first routing agent device and the second routing agent device are different routing agent devices; and the second PCRF transmits the corresponding relationship between the IP address of the user and the identity of the second PCRF.

8. The system according to claim 7, wherein:

the first PCRF further stores the corresponding relationship between the IP address of the UE and the identity of the PCRF currently serving the UE.

9. The system according to claim 8, wherein:

the first PCRF further receives the corresponding relationship between the IP address of the UE and the identity of the second PCRF, and updates the stored corresponding relationship between the IP address of the UE and the identity of the PCRF currently serving the UE with the corresponding relationship between the IP address of the UE and the identity of the second PCRF, wherein the corresponding relationship is transmitted by the second PCRF.

* * * * *